United States Patent [19]

Goto et al.

[11] Patent Number: 4,904,318

[45] Date of Patent: Feb. 27, 1990

[54] METHOD FOR MANUFACTURE OF DIAPHRAGM AND APPARATUS THEREFOR

[75] Inventors: Fumio Goto; Mitsutaka Kondou, both of Gifu; Noboru Nakagawa, Ichinomiya; Tamiyosi Ohashi; Masatoshi Kondo, both of Aichi; Takeru Makino, Ichinomiya; Yoji Mizuno, Niwa, all of Japan.

[73] Assignee: Toyoda Gosei Co., Ltd., Nishikasugai, Japan

[21] Appl. No.: 229,771

[22] Filed: Aug. 4, 1988

Related U.S. Application Data

[63] Continuation of Ser. No. 885,595, filed as JP84/00527 on Nov. 2, 1984, published as WO86/02707 on May 9, 1986, abandoned.

[30] Foreign Application Priority Data

4/28/84 [JP] Japan .................................. 59-86711

[51] Int. Cl.⁴ ..................... B29C 69/00; B32B 31/18; B32B 31/20
[52] U.S. Cl. ....................................... 156/64; 156/353; 156/379; 264/40.1; 264/153; 264/171; 264/257; 425/113; 425/135; 425/296
[58] Field of Search .................. 264/40.1, 153, 171, 264/257; 425/135, 113, 296; 156/353, 64, 379

[56] References Cited

U.S. PATENT DOCUMENTS

| | | | |
|---|---|---|---|
| 1,960,997 | 5/1934 | Halloran | 264/171 |
| 2,748,425 | 6/1956 | Coffey | 264/153 X |
| 3,007,205 | 11/1961 | House | 264/171 |
| 3,067,455 | 12/1962 | Reid | 264/171 X |
| 3,195,180 | 7/1965 | Jagger et al. | 264/153 X |
| 3,267,191 | 8/1966 | Williams et al. | 264/171 X |
| 3,801,406 | 4/1974 | Debenedetti | 264/153 X |

FOREIGN PATENT DOCUMENTS

| | | |
|---|---|---|
| 2431084 | 1/1976 | Fed. Rep. of Germany . |
| 2931715 | 2/1981 | Fed. Rep. of Germany . |
| 45-32659 | 10/1970 | Japan . |
| 49-127219 | 12/1974 | Japan . |
| 56-86732 | 7/1981 | Japan . |

OTHER PUBLICATIONS

W. Seyderhelm, "Das Schneiden und Stanzen von Kunststoffen und Gummi", Carl Hanser Verlag, Munchen Wien, 1978, pp. 71–73.
W. Luers, "Fordergurte und ihre Herstellung", in GAK 3/1978, pp. 176, 182.

Primary Examiner—Jan H. Silbaugh
Assistant Examiner—Catherine Timm
Attorney, Agent, or Firm—Cushman, Darby & Cushman

[57] ABSTRACT

A method and apparatus for the manufacture of a diaphragm from a fabric-containing sheet (material). The fabric-containing sheet produced by an extrusion molding machine in a width which is a multiple of the diameter of diaphragms to be manufactured is continuously fed in fixed pitches to a press vulcanizing device and a punching device, to permit automation of the manufacture of diaphragms and an appreciable reduction in the number of steps. This method, thus, improves the yield of materials used, permits down sizing of the production equipment, and reduces the motive power consumption.

7 Claims, 9 Drawing Sheets

Fig. 18
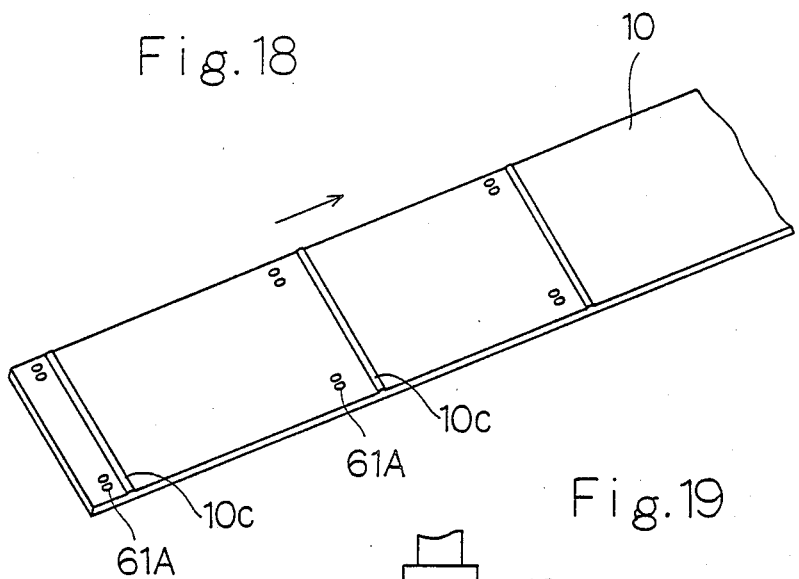
Fig. 19
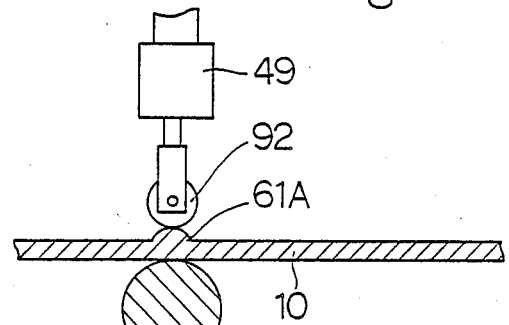
Fig. 20
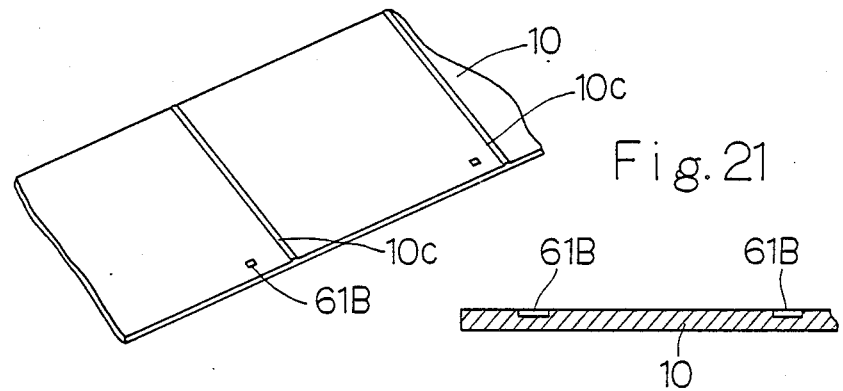
Fig. 21

METHOD FOR MANUFACTURE OF DIAPHRAGM AND APPARATUS THEREFOR

This is a continuation of application Ser. No. 06/885,595, filed as PCT JP84/00527 on Nov. 2, 1984, published as WO86/02707 on May 9, 1986, which was abandoned upon the filing hereof.

BACKGROUND OF THE INVENTION

This invention relates to a method for the manufacture of a diaphragm possessing a rubber layer on both or either of the opposite surfaces of a substrate fabric and an apparatus for performing the method.

The present invention is described with reference to a diaphragm 3 possessing two rubber layers 2 severally on the opposite surfaces of a substrate fabric 1 as illustrated in FIG. 2. The present invention is equally applicable to a diaphragm possessing one rubber layer on only one of the surfaces of a substrate fabric. The material for the substrate fabric 1 is generally a woven fabric of fibers such as of cotton, nylon, rayon, or polyester and the material for the rubber layer is NBR, EPDM, CR, or CO (epichlorohydrin rubber).

The procedure heretofore followed in the manufacture of such a diaphragm is as illustrated in FIG. 27.

A substrate fabric 1 having adhesive agent applied thereof is paid out, led in between compression rolls 102 of a calendering machine 101, and subjected to one-surface topping twice therein to produce a fabric-containing sheet 10. The fabric-containing sheet 10 is cut by a cutting device (not shown) to a prescribed length (generally not less than 1 m) and the cut pieces of the sheet are piled up. The pieces of the fabric-containing sheet 10 are perforated one by one with a punch 104 and a die 103 to produce circular materials 105. The circular materials 105 are set one each in circular depressions 108 in a lower mold 107 of a press vulcanizer 106 and subjected to press vulcanization. The circular materials 105 thus press vulcanized are given secondary vulcanization when necessary and then punched one by one with a punching device 111 to produce diaphragms 3. The diaphragms thus produced are visually tested for diameter and wall thickness, packaged, and shipped. If the substrate fabric is found to have any defective portion due to insufficient application of adhesive agent, for example, it has been customary for that defective portion to be marked by tying a yarn to the lateral part of the substrate fabric so that the defective portion will be removed while the fabric-containing sheet 10 resulting from the topping of the substrate fabric is being cut into separate pieces.

The procedure described above has entailed the following problems.

(a) The fabric-containing sheet produced by the calendering machine has a width (at least 1 m.) large enough for a plurality (at least 10) of diaphragms (generally of a unit diameter of not more than 10 cm) to be obtained in a row in the direction of width of the sheet. Thus, the supply of the rubber material and that of the fabric cannot be easily automated. Further, in the step of press vulcanization, the circular materials must be inserted into and removed from the press vulcanizer manually one by one. The procedure as a whole calls for a large number of steps and the operation does not prove desirable from the standpoint of safety.

(b) It is difficult to give to the fabric-containing sheet produced by calendering a uniform thickness both in the direction of travel and in the direction of width. The fabric-containing sheet, therefore, is liable to include portions deviating in thickness from the specified range. If the substrate fabric happens to include a defective portion, the section of the substrate fabric wholly covering the defective portion and extending throughout the entire width of the substrate fabric must be cut away, degrading the yields of materials used as a whole.

(c) Since the production requires use of the calendering machine, the entire production equipment is quite voluminous and the operation thereof calls for use of a large motive force.

SUMMARY

This invention is directed to a method for the manufacture of diaphragms possessing rubber layers on both or either of the opposite surfaces of substrate fabric and to an apparatus for the manufacture of such diaphragms, which method is characterized by effecting the formation of rubber layers in a fabric-containing sheet by extrusion molding the sheet in a width corresponding to a multiple of the diameter of diaphragms to be produced and by feeding the fabric-containing sheet continuously in fixed pitches to the step of diaphragm shaping process consisting of a press vulcanizing step and a punching step and which apparatus is characterized by having an extrusion molding machine, a press vulcanizing device, and a punching device disposed in the order mentioned to permit embodiment of the method described above and further having the latter two units each provided with a pitch feeding mechanism.

Owing to the method and apparatus described above, the present invention permits a strip of fabric-containing sheet possessing uniform thickness in the direction of width and in the direction of length to be produced with ease. The strip of fabric-containing sheet can be conveyed continuously in its unbroken state to the press vulcanizing step and the punching step. As a result, this invention enjoys (1) an advantage that the manufacture of diaphragms can be automated substantially completely, the number of steps decreased notably, and the safety of operation improved, (2) an advantage that the yield of materials to be used can be greatly improved because the fabric-containing sheet very rarely suffers occurrence of portions deviating in thickness from the specified range and because the elimination of a defective portion, if any, from the substrate fabric can be attained simply by selectively removing the portion generally equalling in area one or a few diaphragms at most, and (3) an advantage that the production equipment as a whole is compact and the operation thereof calls for use of a small motive force because the component devices of the equipment are required only to have a width which is a small multiple of the diameter of diaphragms to be produced.

BRIEF DESCRIPTION OF THE DRAWINGS

FIGS. 1~26 illustrate the present invention.

FIG. 1 is a flow diagram of the process for manufacture of diaphragms.

FIG. 2 is a perspective view of a diaphragm possessing rubber layers one each on the opposite surfaces of a substrate fabric.

FIG. 3 is a perspective view of a substrate fabric having a tape (mark) indicative of a defective portion attached to the lateral part thereof.

FIG. 4 is a perspective view of a fabric-containing sheet formed by applying rubber layers on the substrate fabric of FIG. 3.

FIG. 5 is a perspective view illustrating the fabric-containing sheet of FIG. 4, with a ribbon of woven fabric attached to the surface of a rubber layer as a mark of defective portion.

FIG. 6 is an overall diagram illustrating a typical device for the production of a fabric-containing sheet.

FIG. 7 is a perspective view illustrating a typical rubber material rectifying plate to be used in the device of FIG. 6.

FIG. 8 is a perspective view illustrating another typical rubber material rectifying plate to be similarly used.

FIG. 9 is a perspective view illustrating yet another typical rubber material rectifying plate to be similarly used.

FIG. 10 is a schematic cross section illustrating a typical extrusion molding machine to be used in the device for the production of the fabric-containing sheet.

FIG. 11 is a front view illustrating a typical die in the extruding machine of FIG. 10.

FIG. 12 is a perspective view illustrating the die of FIG. 11 in a disassembled state.

FIG. 13 is a front view illustrating another die which could be used in the extruding device of FIG. 10.

FIG. 14 is a cross-sectional view taken along the line XIV—XIV in the diagram of FIG. 13.

FIG. 15 is a front view of a metal die (in a closed state) to be used in the a press vulcanizing device.

FIG. 16 is a side view of the metal die of FIG. 15.

FIG. 17 is a perspective view of the upper piece of the metal die of FIG. 15 as held upside down.

FIG. 18 is a perspective view of a fabric-containing sheet having raised shape marks formed along the edge portions by press vulcanization.

FIG. 19 is a cross-sectional view of an essential part illustrating the manner in which the shape mark on the fabric-containing sheet of FIG. 18 is detected.

FIG. 20 is a perspective view of a fabric-containing sheet of FIG. 18, having sunken shape marks similarly formed.

FIG. 21 is a longitudinal cross-sectional view taken along a line passing the shape marks in the diagram of FIG. 20.

FIG. 22 is a model cross-sectional view illustrating the essential part of a punching device to be used in the present invention.

FIG. 23 is a cross-sectional view of a punching device embodying the model of FIG. 22.

FIG. 24 is a model cross-sectional view of the essential part of another punching device.

FIG. 25 is a model perspective view illustrating the manner in which the product is withdrawn after the step of punching.

FIG. 26 is a partially sectioned side view of a punching device embodying the model of FIG. 25.

DETAILED DESCRIPTION OF PREFERRED EMBODIMENTS OF THE INVENTION

Figure 1:
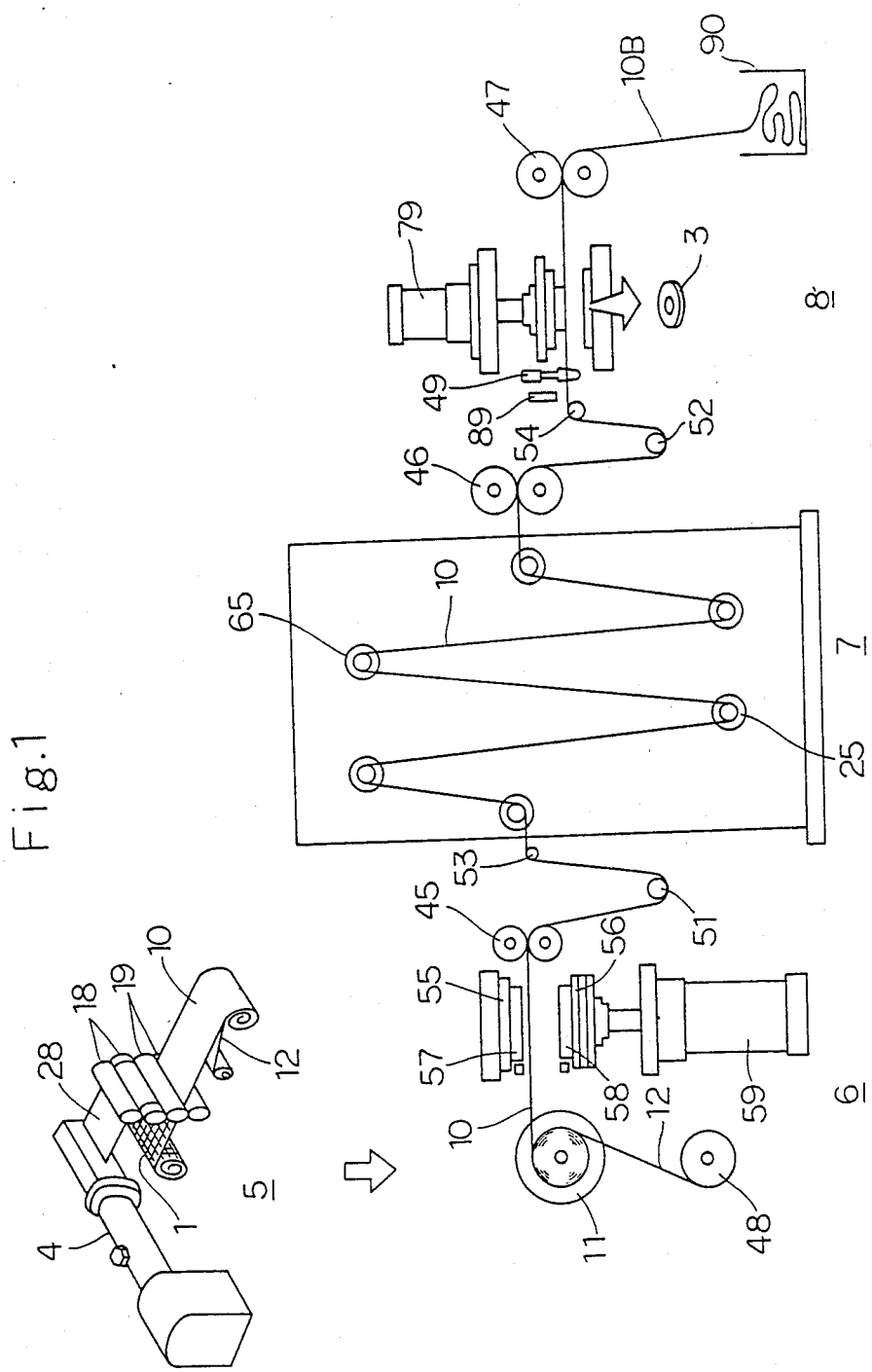
Figure 2:
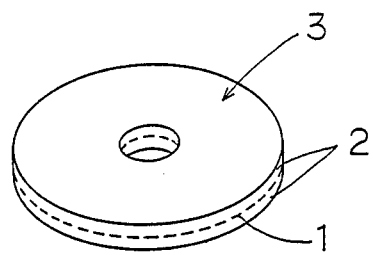

The present invention is depicted in general outline in the process flow diagram of FIG. 1. The method comprises (A) a process for preparation of raw materials and production of fabric-containing sheet and (B) a process for molding of diaphragms (consisting of ① a press vulcanizing step, ② a secondary vulcanizing step, and ③ a punching step) and apparatus for manufacture, therefore, comprises four main devices, i.e. a fabric-containing sheet producing device 5 incorporating an extrusion molding machine 4, a press vulcanizing device 6, a secondary vulcanizing tank 7, and a punching device 8, arranged in the order mentioned to suit the aforementioned flow of processes, with the last three devices provided with means for causing the fabric-containing sheet 10 to be continuously conveyed at fixed pitches.

In the illustrated embodiment, a fabric-containing sheet 10 is taken up and the wound sheet is mounted on a pay-off roll 11 to be introduced into the diaphragm molding process. Optionally, the fabric-containing sheet 10 may be introduced continuously (directly) from the process for fabric-containing sheet production to the diaphragm production process. In that case, the operation can be automated more thoroughly than the operation illustrated and the liner cloth 12 which is necessary when the sheet 10 is taken up can be omitted. Generally, the production capacity of the fabric-containing sheet production device 5 can be fixed at a level several times that of the press vulcanizing device 6. In fact, it is desired to install several press vulcanizing devices 6 for each fabric-containing sheet production device 5. Although the second vulcanization step is desired to be incorporated from the standpoint of decreasing the duration of the press vulcanizing step -- the duration of press vulcanization constituting a governing factor for the productivity of the entire operation, it is not an indispensable requirement for the present invention.

Now, the component steps of the method of this invention and the devices corresponding thereto will be described in detail below.

(A) Process for fabric-containing sheet production

Figure 3:
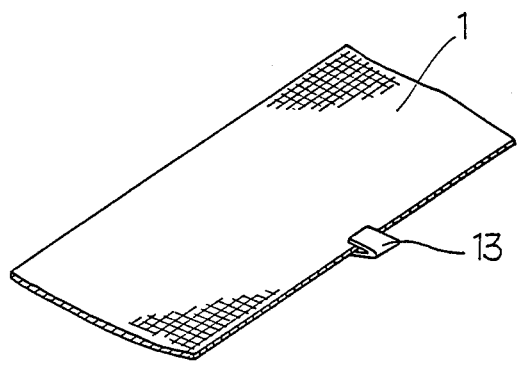
Figure 4:
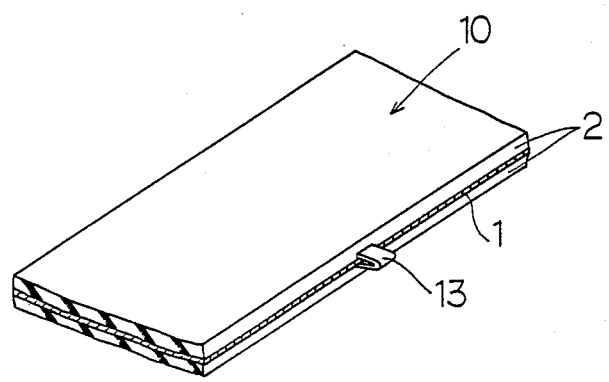
Figure 5:
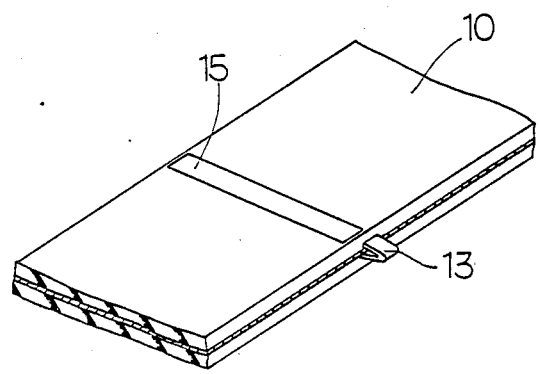

A tape-like substrate fabric 1 of a width which is a multiple (generally one or another one-digit integer of small value) of the diameter of diaphragms to be produced is treated in advance with adhesive agent as by dipping or spreading. If the strip of substrate fabric 1 so treated with adhesive agent happens to contain a defective portion (due to defective weaving or defective application of adhesive agent), a mark 13 is placed on the lateral part with gum tape or yarn as illustrated in FIG. 3. If the strip of substrate fabric has a larger width than the rubber layers, the margins may be marked with colored paint. This mark 13 permits easy visual location of the defective portion in the substrate fabric even after the rubber layers 2 have been deposited on the opposite surfaces of the substrate fabric 1 as illustrated in FIG. 4. Owing to this mark 13, a marking woven fabric (of synthetic fibers or natural fibers) 15 of a color different from the color of the rubber layers can be attached to the surface of the fabric-containing sheet 10 after the production of this sheet as illustrated in FIG. 5. Since this marking member is a woven fabric, it can be easily applied on the fabric-containing sheet without use of any adhesive agent. In the illustrated embodiment, the marking woven fabric is so long as to cover the entire width of the fabric-containing sheet. The length of this marking woven fabric may be one half of the entire width of the sheet when the sheet's width equals the diameter of diaphragms.

Figure 6:
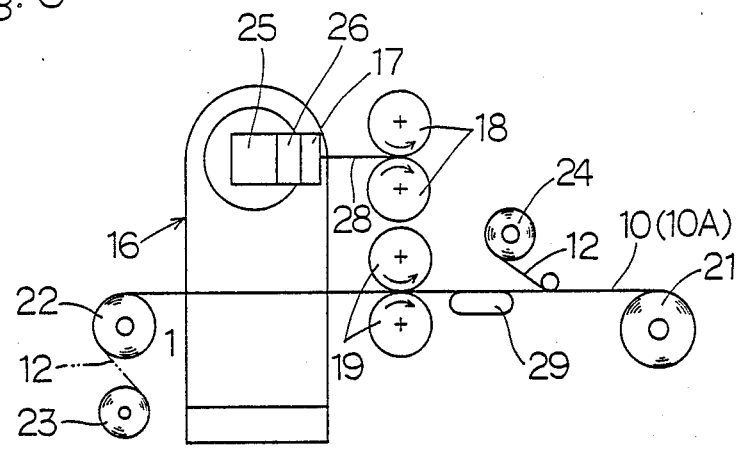

FIG. 6 illustrates a typical device for the production of fabric-containing sheet.

Figure 7:
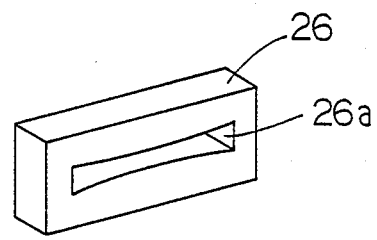
Figure 8:
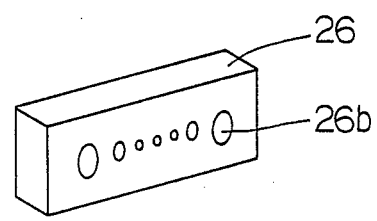
Figure 9:
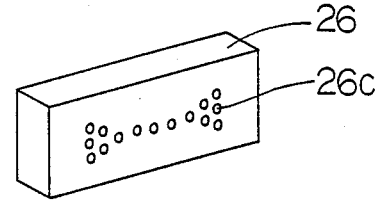

In front of a die 17 of an extrusion molding machine 16, paired pinch rolls 18 and paired applicator rolls 19 are arranged in a vertical direction. A winding roll 21 and an unwinding roll 22 are opposed to each other across the paired applicator rolls 19. Naturally, the die 17 possesses an orifice of a width which is a multiple of the diameter of diaphragms. A roll 24 feeds out a liner 12 and a roll 23 rewinds the liner 12. A rectifying plate 26 is disposed between the die 17 and a head 25. The cross-sectional area of the opening in this rectifying plate 26 is larger in the opposite lateral parts than in the middle part relative to the flow of the material therethrough. The rectifying hole specifically may be in the shape of a slot 26a constricted in the central part as illustrated in FIG. 7, in the shape of a plurality of circular holes 26b having diameters gradually decreased toward the central part as illustrated in FIG. 8, or in the shape of a multiplicity of small holes 26c distributed decreasingly densely toward the central part as illustrated in FIG. 9.

Now, the manner in which the device for sheet production is actually used will be described. It is assumed that in this device, the rubber layers are deposited on the substrate sheet one at a time. Where the two rubber layers are desired to be deposited on the opposite surfaces of the sheet continuously by a once through treatment, two sheet production devices may be arranged in a row.

First, a roll of substrate fabric 1 is set in place on the unwinding roll 22. The substrate fabric 1 from this roll is introduced in between the paired applicator rolls 19. At the same time, a sheet of rubber 28 extruded from the die 17 of the extrusion molding machine 16 is introduced in between the paired pinch rolls 18, there to be given necessary tensile strength and adjusted in thickness. The sheet of rubber is also introduced in between the paired applicator rolls 19. Consequently, the applicator rolls 19 feed out a fabric-containing sheet 10A having a rubber layer formed on only one surface. This sheet 10A is wound up in a roll and the roll thus formed is again set in place on the unwinding roll 2 and subjected again to the procedure described above. Consequently, a fabric-containing sheet 10 having rubber layers formed on both the opposite surfaces thereof is obtained in a width which is a multiple of the diameter of the diaphragms to be produced. If the substrate fabric happens to contain a defective portion, the application of the aforementioned marking woven fabric 15 to this sheet 10 may be carried out while the sheet is in motion on a conveyor 29.

During the aforementioned procedure, the rubber material which has been kneaded and forwarded inside an extruding barrel as with a screw flows more toward the opposite lateral sides than toward the central part of the orifice of the die 17 because the cross-sectional area of the opening of the rectifying plate 26 is greater in the opposite lateral parts than in the central part. Here, the rubber material is extruded from the die 17 in a uniform thickness throughout the entire width thereof because the opposite lateral parts of the orifice which are each enclosed with land wall surfaces on three sides have greater resistance to flow than the central part which is enclosed with land wall surfaces on two sides. If this rectifying plate 26 is omitted, then the rubber material is liable to be extruded in a smaller wall thickness in the opposite lateral parts than in the central part. The extruded sheet of rubber thus obtained is rejectable because of the insufficient wall thickness in the opposite lateral parts. To preclude this trouble, it becomes necessary for the fabric-containing sheet 10 to be produced in a width amply larger than the aforementioned multiple of the width of diaphragms. This setup proves undesirable from the standpoint of the yield of raw materials used.

Figure 10:
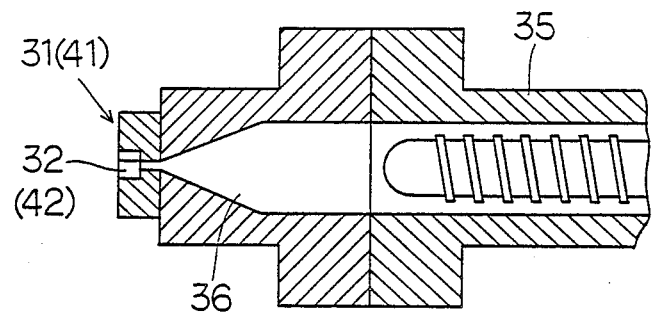

FIG. 10 is a cross-sectional view illustrating another typical extrusion molding machine usable in the device of FIG. 6.

In this extrusion molding machine, the upper and lower land surfaces 33, 34 in the orifice 32 of the die 31 having a width which is a multiple of the diameter of diaphragms have a greater length in the opposite lateral parts than in the central part so as to bring about the same effect as obtained with the aforementioned rectifying plate. The die 31 is attached to the extruding barrel 35 through the medium of an extruding head provided with a material flow path 36 converged gradually in the direction from the barrel outlet to the die inlet.

Figure 11:
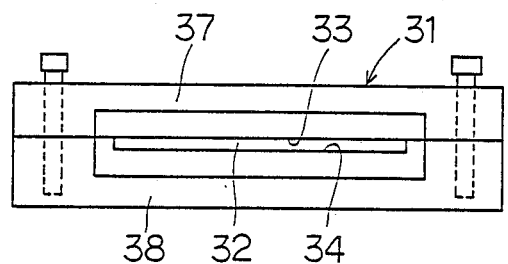
Figure 12:
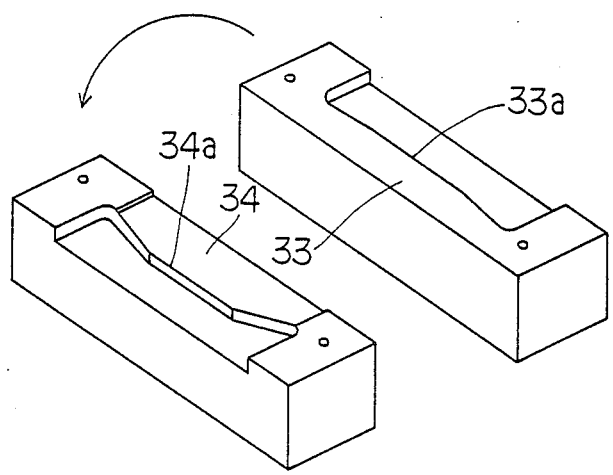
Figure 13:
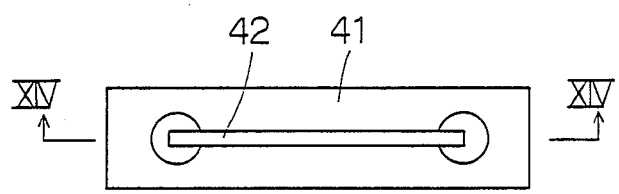
Figure 14:
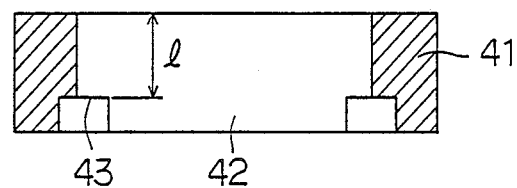

In its concrete embodiment, the aforementioned die 31 is divided across the upper land surface 33 into an upper die 37 and a lower die 38 as illustrated in FIGS. 11–12, with the length of land gradually decreased from the central part toward the opposite lateral parts of the orifice. To be more specific, the front edges 33a, 34a of the upper and lower land surfaces form a trapezoid having a flat center on the top. Although the opposite lateral sloping sides of the trapezoid are in straight form in the illustration to ensure ease of cutting of the material in flow, they may be in curved form when necessary. Instead of separating the die 41 into the upper and lower dies as described aobve, the opposite lateral ends of the orifice 42 may be hollowed out from the front side to form stepped faces 43 so that the length l of the land surface in the opposite lateral parts of the orifice may be decreased by a step as illustrated in FIGS. 13–14. In this case, the effect of uniformizing the distribution of the material in flow is slightly inferior but the ease of the cutting of the die is decisively high.

Now, the operation of the die 31 (41) will be described. The rubber material which has been advanced as kneaded inside the extruding barrel 35 as with a screw is allowed to flow into the orifice 32 (42) of the die 31 (41). Here, the difference of resistance to flow in the opposite lateral parts and the central part in the cross section of the aforementioned orifice 32 (42) is absorbed by the difference of length of the land surfaces. Consequently, the rubber material is extruded through the die 31 (41) in a uniform thickness throughout the entire width thereof. Although the difference of land length in the direction of the width of the orifice is not an indispensable requirement, the absence of this difference is undesirable for the same reason as that for the absence of the aforementioned rectifying plate. The sheet of rubber 28 extruded through the aforementioned die 17, 31, or 41 has a uniform thickness throughout the entire width therefore thereof. This uniform thickness is not necessarily equal to the thickness the sheet of rubber 28 is expected to possess. This fact is ascribable to the influences of the discharge force of the extrusion molding machine, the viscoelastic property of the rubber material, and the pressure used for the extrusion, for example. Even when these factors are taken into due consideration, it is extremely difficult to design the die so that the extruded sheet of rubber will acquire a prescribed thickness. In the production device under discussion, therefore, it is desired to rotate the paired pinch rolls 18 at a speed higher than the speed at which the sheet of rubber is extruded through the die 17, 31, or 41 so as to impart tensile strength to the sheet of rubber and, by means of this tensile strength, stretch this sheet of rubber 28 and reduce its thickness to a prescribed level.

(B) Process for diaphragm molding

As described above, this process for diaphragm molding consists of the three main steps, i.e. the press vulcanizing step, the secondary vulcanizing step, and the punching step. To suit the flow of these three steps, the press vulcanizing device 6, the secondary vulcanizing tank 7, and the punching device 8 are arranged sequentially. To permit continuous conveyance of the fabric-containing sheet (material) 10 of a width corresponding to the diameter of diaphragms through these devices, the devices 6, 7, and 8 are provided in their respective sheet discharging portions with first, second, and third rewinding rolls 45, 46, and 47 and, at the same time, the press vulcanizing device 6 is provided in the sheet inlet portion with an unwinding roll 11 and a liner rewinding roll 48. The drive source for the first rewinding rolls 45 is connected through a control circuit to the drive source, a hydraulic press 59, of the press vulcanizing device 6. Thus, the first rewinding rolls 45 are enabled to feed the fabric-containing sheet 10 in pitches of a prescribed length (Slightly larger than the length for one round of vulcanization), depending on the opening and closing of the mold of the press vulcanizing device 6. The drive source of the third rewinding rolls 47 is connected through a control circuit to the drive source, a cylinder, of the punching device and is adapted to admit the signal from a shape mark sensor 49. To be more specific, the third rewinding rolls 47 are enabled to feed the fabric-containing sheet at pitches controlled by the signal from the shape mark sensor 49, depending on the punching operation of the punching device 8. In the meantime, the second rewinding rolls 46 are generally driven continuously. On the discharge sides of the first and second rewinding rolls 45, 46, there are arranged accumulator rolls 51, 52 and guide rolls 53, 54 so as to smooth the conveyance of the fabric-containing sheet 10 between the devices.

Now, the aforementioned press vulcanizing device 6, the secondary vulcanizing tank 7, and the punching device 8 will be described in detail below.

(1) Press vulcanizing device

Figure 15:
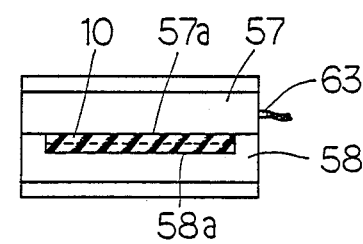
Figure 16:
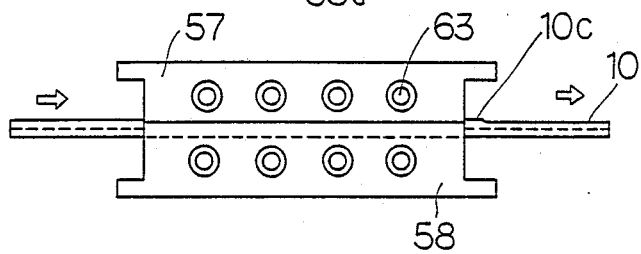
Figure 17:
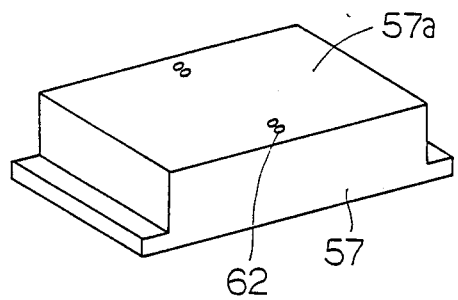

As illustrated in FIG. 1, an upper metal die 57 and a lower metal die 58 are attached respectively to a stationary base 55 and a movable base 56. The movable base 56 is attached to a hydraulic press 59. These metal dies are specifically embodied as illustrated in FIGS. 15~17. In the lower die 58, a lower press surface 58a is formed as depressed to a depth slightly smaller than the thickness of the fabric-containing sheet (unvulcanized) 10 throughout the entire length in the direction of sheet conveyance. In the upper die 57, an upper press surface 57a is formed on the lower side thereof. In the central part of the upper press surface 57, two holes 62 for forming raised locating shape marks 61A on the fabric-containing sheet (vulcanized) 10 are disposed on each of the opposite edges. These shape marks are intended to allow the portion of the fabric-containing sheet 10 vulcanized in the press vulcanizing device to be accurately punched in the punching step which will be described more fully afterward, namely to prevent the punching from being performed in a portion including the portion 10c of the rubber material which has protruded from the metal dies 57, 58 during the press vulcanization. Such shape marks may be formed only on one edge of the fabric-containing sheet 10 or may be in depressed shape as illustrated in FIGS. 20~21. In FIG. 16, 63 denotes a heater.

Between the metal dies 57, 58 of the press vulcanizing device 6, the fabric-containing sheet 10 is inserted by the first rewinding rolls and compressed and heated for a prescribed length of time (180° C.×3 minutes, for example). Consequently, the prescribed length (generally equalling the diameter of one diaphragm, optionally the combined diameter of several diaphragms) of the fabric-containing sheet 10 is press vulcanized in a prescribed thickness.

(2) Secondary vulcanizing tank

As illustrated in FIG. 1, the vulcanizing tank 7 incorporating therein a heat generating device (not shown) is provided therein a plurality of guide rolls 65 arranged in a zigzagging pattern so as to enable the press vulcanized fabric-containing sheet 10 to be retained for a prescribed length of time in the vulcanizing tank 7. The heat source for the vulcanizing tank may be hot air or a steam heater, for example.

In this secondary vulcanizing tank 7, the press vulcanized fabric-containing sheet 10 is brought in continuously by the second rewinding rolls 46 and then retained under a prescribed heating atmosphere for a prescribed length of time (120 minutes, for example) to undergo secondary vulcanization.

(3) Punching device

Figure 22:
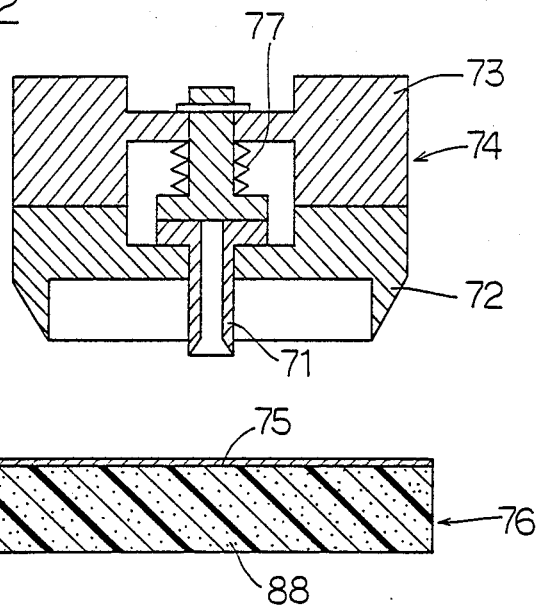

FIG. 22 is a model diagram illustrating the essential part of the punching device for use in the present invention. This punching device comprises an awl 74 provided with a slide 73 having inner blades 71 and outer blades 72 mounted thereto vertically movably substantially simultaneously and a receiving base 76 having a blade guide plate 75 mounted thereon as opposed to the punch 74. The inner blades 71 are attached to the slide 73 through the medium of a spring 77 which is exposed to the compressive action while the punch is in use. The blade guide plate 75 possesses surface hardness enough to avoid sustaining injury by the cutting edges of the inner and outer blades 71, 72. The portion of the receiving base 76 for supporting the blade guide plate 75 is made of an elastic member 88.

Figure 23:
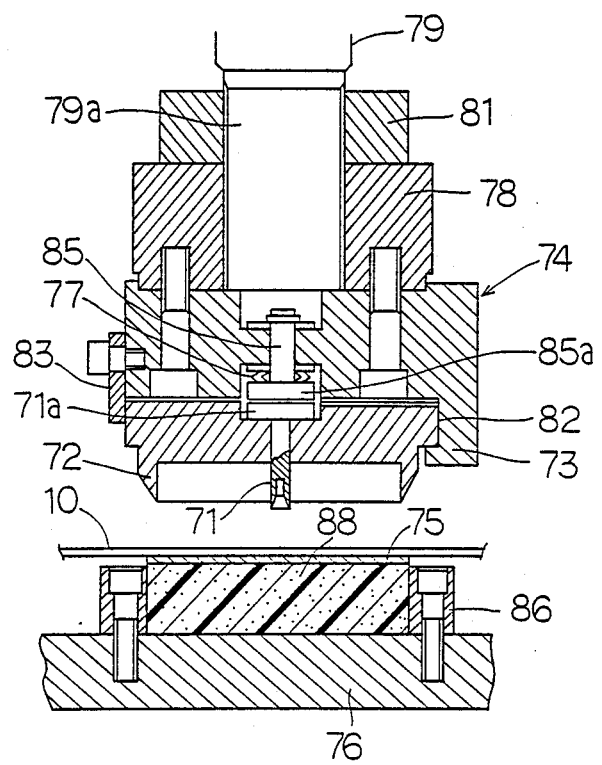

The aforementioned punching device is embodied as illustrated in FIG. 23.

In the punch 74, the slide 73 having the inner and outer blades 71, 72 attached thereto is secured to a connecting member 78 with bolts and the connecting member 78 is helically attached to a rod 79a of a pneumatic cylinder 79. By 81 is denoted a nut for preventing accidental unscrewing. Here, the outer blades 72 are secured to a U-shaped groove 8a along one side opening formed on the slide 73 by means of an engaging pin 83. The inner blades 71 are slidably retained in the outer blades 72. Further, the head 71a at the upper end of the inner blades 71 is held as pressed against the lower base 85a of an energizing rod 85 slidably retained by a belleville spring 77 of the slide 73 as energized downwardly. When desired, the belleville spring 77 may be substituted by a compression coil spring.

On the receiving base 76, the elastic member 88 made of urethane rubber is fixed with a bolted retaining frame 86. On the elastic member 88, the blade guide plate 75 made of stainless steel is fixed such as with adhesive agent. The elastic member may be made of some other elastomer. When necessary, it may be substituted by a metal spring or a fluid spring. The blade guide plate 75 may be made of metal or ceramic or other material so far as it possesses surface hardness enough to avoid sustaining injury by the inner and outer blades. Use of a material of excessively high hardness proves undesirable because the blade guide plate 75 made of such material has the possibility of breaking the inner and outer blades 71, 72. In the experiment conducted by the inventors, stainless steel has exhibited the most desirable performance.

On the inlet side of the punching device 8, sensors 89, 49 for detecting the woven fabric 15 marking the defective portion of the substrate fabric and the locating shape mark 61A are disposed. These sensors 89, 49 are specifically embodied respectively by a color discriminating sensor and a limit switch provided with a rotary contact piece 92 on a feed roller 91 as illustrated in FIG. 19. This limit switch may be substituted by a potentiometer. Of course, the signals from these sensors 89, 49 are fed into the drive source for the pneumatic cylinder 79 of the punching device and the drive source for the third rewinding rollers 47 through respective control circuits.

Figure 25:
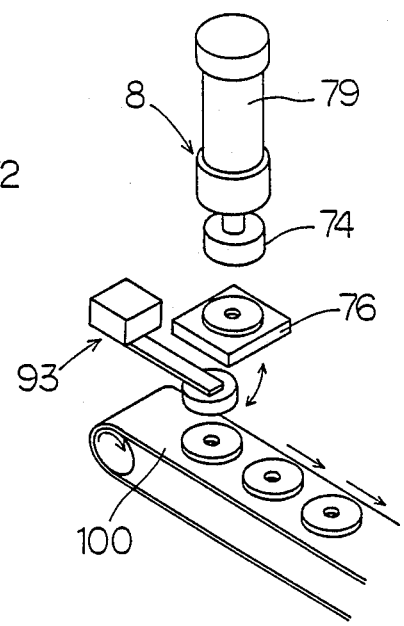
Figure 26:
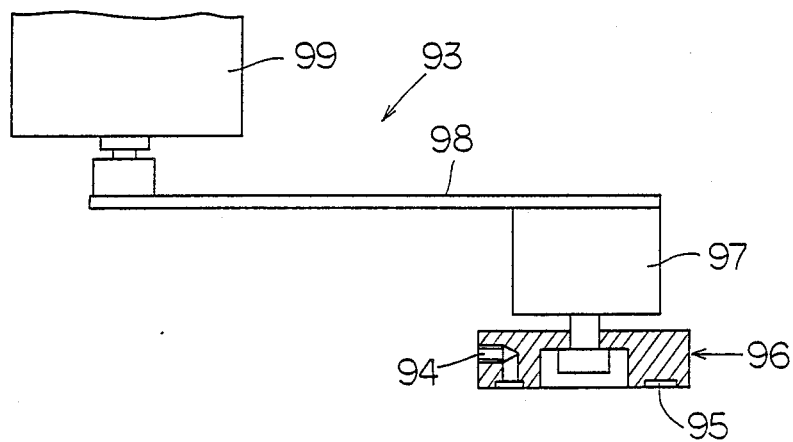
Figure 27:
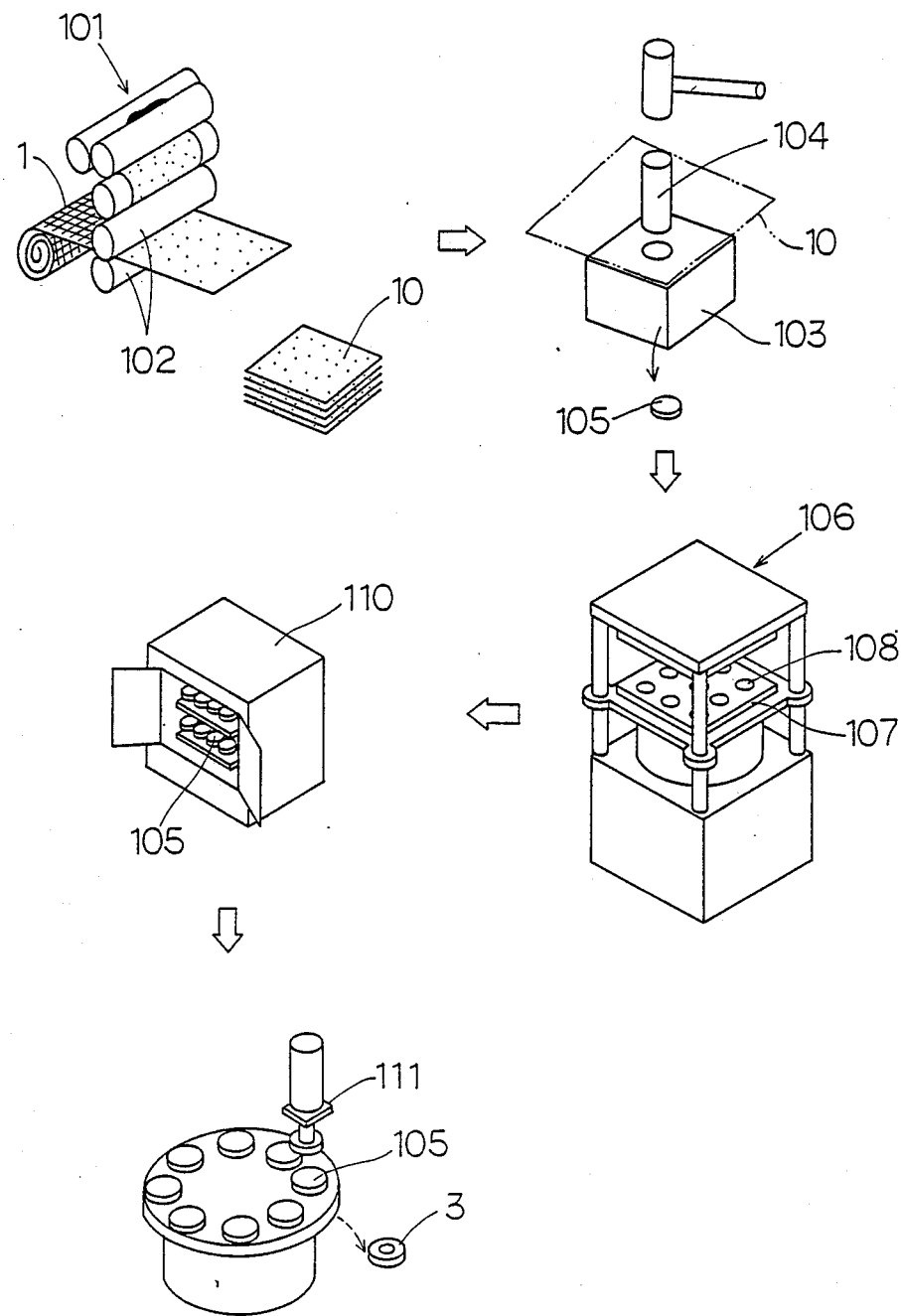
FIG. 27 is a flow diagram of the conventional process for the manufacture of diaphragms.

Further, the punching device 8 is provided with a diaphragm remover 93 as illustrated in FIGS. 25 ~26. One typical embodiment of the diaphragm remover will be described with reference to FIG. 26. A vacuum suction device 96 provided in one lateral side with a vacuum hose connection hole 94 and further provided on the lower side with an annular suction groove 95 is attached to the leading end of a rotary arm 98 vertically movably with the pneumatic cylinder 97. This rotary arm 98 is so adapted that the leading end thereof will be reciprocated between the punching device 8 and a testing belt conveyor 100 by means of an air motor 99 having the angle of rotation thereof controlled by a microswitch, for example.

Now, the manner in which the aforementioned punching device is used will be described below.

The fabric-containing sheet 10 discharged from the secondary vulcanizing tank 7 is introduced by the third rewinding rolls 47 into the punching device 8.

If, in this case, the fabric-containing sheet 10 bears thereon a locating woven fabric 15 marking the position of a defective portion, the signal from the color discriminating sensor 89 is fed into the drive source for the pneumatic cylinder of the punching device 8 and the drive source for the third rewinding rolls 47, with the result that the punching operation is suspended and the fabric-containing sheet 10 is forwarded by a distance equal two pitches. If, in this case, the color discriminating sensor 89 operates erroneously to effect the punching operation, this erroneous operation has absolutely no possibility of damaging the blades 71, 72 because the material subjected to the detection is the woven fabric 15. Further, the signal from the limit switch 49 which has sensed the locating shape mark 61A is fed into the drive source for the pneumatic cylinder 79 and the drive source for the third rewinding rolls 41 in much the same manner as described above. After the limit switch has been turned on, the fabric-containing sheet 10 is advanced by a prescribed amount and brought to a stop at a position where the portion 10c of the fabric-containing sheet is not subject to punching. Then, the punching is performed to complete the formation of a diaphragm 3. When the limit switch is positioned so that it will be enabled to sense the next shape mark while the fabric-containing sheet 10 is being forwarded by the prescribed amount, required stop of the fabric-containing sheet 10 at the aforementioned position may be attained by providing a plurality of circuits for memorizing the amount of advance and effecting necessary control of the pitches of conveyance. This arrangement proves highly desirable for effective utilization of the materials.

Now, the punching operation will be carried out as follows.

Figure 24:
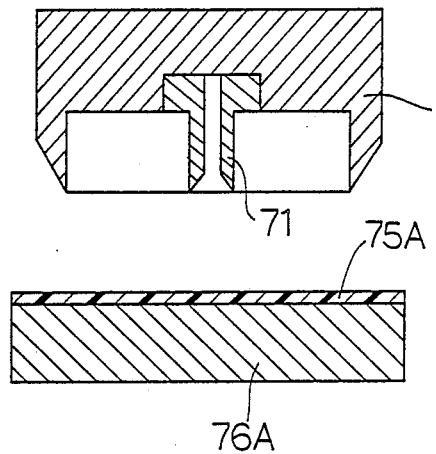

As the slide 73 on which the inner and outer blades are attached is lowered by such drive means as a cylinder, for example, the cutting edge of the inner blades 71 comes into contact with the fabric-containing sheet 10. As the slide 73 is further lowered, the outer blades 72 also come into contact with the fabric-containing sheet 10 to start punching the fabric-containing sheet 10. Since the constant of the spring 77 is fixed in advance so that the force enough for punching will be conferred upon the inner blades 71, the inner blades 71 also begin punching the same sheet. Thus, the inner and outer blades 71, 72 finish punching the fabric-containing sheet 10 at the same time. Since the blade guide plate 75 is supported on the base 76 through the medium of the elastic member 88, the possible deviation in the parallelism between the blade guide plate 75 and the inner and outer blades 71, 72 can be absorbed and, at the same time, the impact the inner and outer blades 71, 72 exerts upon the blade guide plate 75 is alleviated. At the time that the awling is completed, even when the blade guide plate 75 possesses surface hardness enough to avoid sustaining damage by the inner and outer blades 71, 72, there is no possibility of the inner and outer blades 71, 72 sustaining impacts of local load and breakage of the cutting edge. Further since the blade guide plate 75 possesses surface hardness as described above, it has no possibility of sustaining any cut by the inner and outer blades 71, 72. The inner and outer blades 71, 72, therefore, have no possibility of sustaining injury by contact with the blade guide plate 75. The embodiment of the punching device is not limited to that which has been described so far. When the punching device is embodied so that, as illustrated in FIG. 24, the inner blades 71 and the outer blades 72 are simultaneously moved vertically and the blade guide plate 75A made of synthetic resin is mounted directly on the receiving base 76A, there ensue the following problems.

(a) Since the cylinder exerts equal load upon the outer blades and the inner blades, the inner blades sustains more load than is necessary and the cutting edge of the inner blades, therefore, suffers from early growth of fatigue.

(b) The cuts inserted in the blade guide plate have the possibility of bending the cutting edge of the inner and outer blades and consequently inflicting damage thereon. As the result, the blade guide plate must be replaced with a new supply at short intervals (generally once daily).

(c) The cuts inerted in the blade guide plate tend to produce chips which will adhere to the produced diaphragm and degrade the quality.

The diaphragm 3 which has undergone the punching treatment is removed by vacuum suction of the remover 93 and transferred on the belt conveyor 100 for visual inspection with respect to size and appearance. If a group of diaphragms happen to include a diaphragm with a defective portion, the particular diaphragm in trouble can be readily discerned with the aid of the marking woven fabric 15 attached to the surface. The remnant which is produced after the punching operation, namely, the fabric-containing sheet 10B, is drawn up by the third rewinding rolls 47 and the portion cut off the central portion is advanced by a conveyor (not shown) to a scrap receptacle 90.

What is claimed is:

1. A method for manufacturing a plurality of ring-shaped diaphragms, comprising:

continuously extruding at least one sheet of rubber having a substantially uniform thickness both lengthwise thereof and widthwise thereof throughout the full width thereof;

stretching said sheet of rubber, after said sheet of rubber has been extruded, but before said sheet of rubber has been applied to a substrate fabric, so as to provide said sheet of rubber with an adjusted substantially uniform wall thickness;

providing a substrate fabric having two opposite surfaces and a lateral edge;

forming a mark on the lateral edge of a defective portion of said substrate fabric prior to the application of said rubber layer thereto so conspicuously as to be visually discerned even after application of said rubber layer to said substrate fabric;

continuously applying said sheet of rubber facewise to a respective one of said surfaces of said substrate fabric so as to provide a fabric-containing sheet;

applying adjacent said mark a locating woven fabric of a color different from the color of said rubber layer to a surface of said rubber layer after attachment of said rubber layer to said substrate fabric, so that the defective portion in the fabric-containing sheet or in a diaphragm produced therefrom can be detected by sensing the presence of said locating woven fabric;

continuously feeding said fabric-containing sheet through a press-vulcanizing station at which successive increments of said fabric-containing sheet are press-vulcanized; each such increment being sufficiently long and wide as to permit punching of at least one complete ring-shaped diaphragm therefrom, and all such increments being both substantially equal in length and equally spaced in succession longitudinally of said fabric-containing sheet;

in said press-vulcanizing station, as each said increment of said fabric-containing sheet is press-vulcanized by press platens, forming at least one shape mark into each increment of said fabric-containing sheet at a uniform location on such increments;

continuously feeding said fabric-containing sheet, after vulcanization thereof, through a punching station at which said successive increments of said fabric-containing sheet are punched using a ring punch at uniformly spaced intervals lengthwise thereof to produce a series of ring-shaped diaphragms;

at said punching station, sensing said shape marks and correlating the position thereof with the position of punching of said fabric-containing sheet so as to punch successive ring-shaped diaphragms from like positions on said successive increments of said fabric-containing sheet; and inspecting said fabric-containing sheet in connection with continuously feeding said fabric-containing sheet through said punching station, using a color-discriminating sensor, and using sensing of said different color of said locating fabric on respective particular increments of said fabric-containing sheet to control a punching operation in said punching station so as to avoid punching ring-shaped diaphragms which would contain a marked substrate fabric defect.

2. The method of claim 1, further comprising:

conducting a secondary vulcanization of said fabric-containing sheet between said press vulcanizing station and said punching station.

3. Apparatus for manufacturing a plurality of ring-shaped diaphragms, comprising:

an extruder for continuously extruding a sheet of rubber having a substantially uniform thickness both lengthwise thereof and widthwise thereof throughout the full width thereof, said sheet being substantially equal in width to the cumulative width of a whole number of said diaphragms, said number being between 1 and 9;

means for continuously applying said sheet of rubber facewise to a respective one of two opposite surfaces of a substrate fabric so as to provide a fabric-containing sheet;

said means for continuously applying said sheet of rubber facewise to a surface of said substrate fabric including applicator rolls having a nip through which the sheet of rubber and the substrate fabric may be co-fed for squeezingly applying the sheet of rubber to the substrate fabric;

pinch roll means interposed between said extruder and said applicator rolls for tensioning said sheet of rubber before said sheet of rubber is applied to said substrate fabric;

a press-vulcanizing station including means for continuously feeding said fabric-containing sheet therethrough and means for press-vulcanizing successive increments of said fabric-containing sheet such that each successive increment is sufficiently long and wide as to permit at least one complete ring-shaped diaphragm to be punched therefrom, and such that all such increments are both substantially equal in length and equally spaced in succession longitudinally of said fabric-containing sheet;

said press-vulcanizing means includes press platen means having means for forming at least one shape mark into each increment of said fabric-containing sheet at a uniform location on such increment;

a punching station including means for continuously feeding said fabric-containing sheet, after press-vulcanization thereof, through said punching station, and at least one ring punch means for punching said successive increments of said fabric-containing sheet, at uniformly spaced intervals lengthwise thereof so as to produce a series of ring-shaped diaphragms;

said punch means comprising a slide moving radially inner and outer blades, means for simultaneously moving said blades towards and away from said fabric-containing sheet, and opposed to said blades, a receiving base having a blade guide plate supported thereon for guiding said blades as said blades cut through said fabric-containing sheet;

said inner blade of said punch means being attached to said slide so as to slightly protrude forwardly of said outer blade by means of a spring which is adapted to be contracted during punching, said spring having a spring constant large enough to impart to said inner blade a force capable of cutting through said fabric-containing sheet, said blade guide plate possessing a surface hardness enough to avoid sustaining damage by said inner and outer blades, and said receiving base including a portion which supports said blade guide plate and is formed of an elastic material;

said punching station including means for sensing said shape marks and for correlating the position thereof with the position of punching of said fabric-containing sheet so as to punch successive ring-shaped diaphragms from like positions on said successive increments of said fabric-containing sheet;

a color-discriminating sensor arranged to detect on said fabric-containing sheet entering said punching station the presence of an applied mark of predetermined color on any said increment of said fabric-containing sheet; and said color-discriminating sensor being operatively connected to said punching means for preventing said punching means from punching from any said increment a ring-shaped diaphragm which, if punched from said fabric-containing sheet, would contain a said applied mark of predetermined color;

said means for sensing said shape marks and for correlating the position thereof with the position of punching of said fabric-containing sheet comprises a sensor disposed upstream of said ring punch means, for detecting said shape marks;

said continuously feeding means of both of said press-vulcanizing station and of said punching station including upstream means for unrolling said fabric-containing sheet from a rolled condition and downstream means for re-rolling said fabric-containing sheet into a rolled condition; and said means for re-rolling said fabric-containing sheet into a rolled condition downstream of said punching station including means for rollingly driving this means for re-rolling, and an automated control circuit operatively connecting said sensing device and said rollingly driving means so that said rollingly driving means is driven in relation to timing of detection of said shape marks.

4. The apparatus of claim 3, wherein:

said extruder includes a transversely extensive extruding die through which said sheet of rubber of uniform thickness issues; and said extruder further includes, immediately upstream of said extruding die a rectifying plate provided with transversely extensive aperture means having a smaller cross-sectional area of orifice centrally thereof than laterally thereof, so as to preferentially laterally direct rubber to be extruded through said extruding die.

5. The apparatus of claim 3, wherein:

said extruder includes a transversely extensive extruding die having two opposed transversely extending lands each having a central portion and two oppositely extending lateral portions; said lands being shorter in said lateral portions than in said central portions thereof.

6. The apparatus of claim 3, further including:

a moving conveyor belt serving said punching station;

a transfer arm juxtaposed with said moving conveyor belt and said punching means, said transfer arm including a vacuum pick-up device arranged to successively remove ring-shaped shaped diaphragms from said punching means using said vacuum pick-up device and to deposit them on said moving conveyor so as to permit visual inspection of said ring-shaped diaphragms on said moving conveyor.

7. The apparatus of claim 3, further including:

a secondary vulcanizing station interposed between said press-vulcanizing station and said punching station and adapted to secondarily vulcanize said fabric-containing sheet prior to punching of ring-shaped diaphragms therefrom;

said secondary vulcanizing station including means for generating a current of hot air and applying said current of hot air to said fabric-containing sheet.

* * * * *

UNITED STATES PATENT AND TRADEMARK OFFICE
CERTIFICATE OF CORRECTION

PATENT NO. : 4,904,318

DATED : February 27, 1990

INVENTOR(S) : GOTO, et al.

It is certified that error appears in the above-identified patent and that said Letters Patent is hereby corrected as shown below:

On the title page, delete the following:

[30]   Foreign Application Priority Data

4/28/84  [JP]   Japan .......... 59-86711

Signed and Sealed this

Thirteenth Day of April, 1993

Attest:

STEPHEN G. KUNIN

*Attesting Officer*      Acting Commissioner of Patents and Trademarks